（12） United States Patent
Brockhaus et al.

(10) Patent No.: US 9,080,905 B2
(45) Date of Patent: Jul. 14, 2015

(54) METHOD FOR OPERATION OF SEVERAL ADJACENT MAGNETIC-INDUCTIVE FLOW METERS

(75) Inventors: Helmut Brockhaus, Oberhausen (DE); Wilhelm Florin, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 158 days.

(21) Appl. No.: 13/605,335

(22) Filed: Sep. 6, 2012

(65) Prior Publication Data

US 2013/0061685 A1   Mar. 14, 2013

(30) Foreign Application Priority Data

Sep. 9, 2011   (DE) .......................... 10 2011 112 763

(51) Int. Cl.
*G01F 1/58* (2006.01)
*G01F 1/60* (2006.01)
*G05B 19/042* (2006.01)

(52) U.S. Cl.
CPC .. *G01F 1/58* (2013.01); *G01F 1/60* (2013.01); *G05B 19/0423* (2013.01)

(58) Field of Classification Search
CPC .......... G01F 1/58; G01F 1/60; G05B 19/0423
USPC ......................... 73/861.08–861.17
See application file for complete search history.

(56) References Cited

U.S. PATENT DOCUMENTS

| 5,388,455 | A | * | 2/1995 | Hamby et al. ............. 73/152.29 |
| 6,611,775 | B1 | * | 8/2003 | Coursolle et al. ............... 702/65 |
| 7,261,001 | B2 |   | 8/2007 | Heijnsdijk et al. |
| 7,628,080 | B1 | * | 12/2009 | Feller .......................... 73/861.12 |
| 8,249,752 | B2 |   | 8/2012 | Suzuki |
| 2008/0288933 | A1 |   | 11/2008 | Budmiger et al. |
| 2010/0082168 | A1 |   | 4/2010 | Suzuki |
| 2010/0126282 | A1 |   | 5/2010 | Neuburger et al. |
| 2010/0132478 | A1 |   | 6/2010 | Pelayo |

FOREIGN PATENT DOCUMENTS

DE         197 08 857 A1   7/1998
DE    10 2007 062 394 A1   6/2009

(Continued)

*Primary Examiner* — Lisa Caputo
*Assistant Examiner* — Philip Cotey
(74) *Attorney, Agent, or Firm* — Roberts Mlotkowski Safran & Cole, P.C.; David S. Safran

(57) ABSTRACT

A method for operation of several adjacent magnetic-inductive flow meters, each of which has a measurement tube through which an electrically conductive medium flows, a magnetic field generating apparatus for permeating the medium with a magnetic field having a component perpendicular to the longitudinal axis of the measurement tube, and a measurement apparatus for measuring the voltage induced into the medium and for determining the flow rate from the induced voltage. Each flow meter has a control apparatus. In order to prevent variations of mutual influences on the flow rate measurements by the magnetic fields of adjacent flow meters, measured flow rate values from individual measurement processes and synchronous measurement processes are used to determine the mutual influences on the flow rate measurements, and influences that are free of variations are compensated by the magnetic fields of the adjacent flow meters being synchronized.

8 Claims, 2 Drawing Sheets

(56) References Cited

FOREIGN PATENT DOCUMENTS

| | | | |
|---|---|---|---|
| JP | 2001-348092 A | 12/2001 |
| JP | 2002-214007 A | 7/2002 |
| JP | 2010-085160 A | 4/2010 |
| WO | 03/049366 A2 | 6/2003 |
| WO | 2009/080549 A2 | 7/2009 |

* cited by examiner

METHOD FOR OPERATION OF SEVERAL ADJACENT MAGNETIC-INDUCTIVE FLOW METERS

BACKGROUND OF THE INVENTION

1. Field of the Invention

The invention relates to a method for operation of several adjacent magnetic-inductive flow meters, each of the flow meters comprising a measurement tube through which an electrically conductive medium has flowed, a magnetic field generating apparatus for permeating the medium with a magnetic field which comprises a component perpendicular to the longitudinal axis of the measurement tube, and a measurement apparatus for measuring the voltage which has been induced into the medium and for determining the flow rate from the induced voltage. Furthermore, the invention also relates to an arrangement of several adjacent magnetic-inductive flow meters, each of the adjacent flow meters having a control apparatus and the control apparatus implementing the aforementioned method.

2. Description of Related Art

Magnetic-inductive flow meters have been widely known in the prior art for decades. Reference is made by way of example to the literature citation *Technical Flow Rate Measurement* by Dr. Eng. K. W. Bonfig, 3rd edition, Vulkan-Verlag Essen, 2002, pp. 123 to 167 and moreover to the literature citation *Principles of Magnetic-Inductive Flow Rate Measurement* by Cert. Eng. Friedrich Hoffmann, 3rd ed., publication of the company KROHNE Messtechnik GmbH & Co. KG, 2003.

The basic principle of a magnetic-inductive flow meter for measuring the flow rate of a flowing medium goes back to Michael Faraday who suggested, as early as 1832, the use of the principle of electromagnetic induction for measuring the flow velocities of an electrically conductive medium. According to the Faraday Law, in such a flowing medium which is permeated by a magnetic field, an electrical field intensity arises perpendicular to the flow direction of the medium and perpendicular to the magnetic field. The Faraday Induction Law is used in magnetic-inductive flow meters in that, by means of a magnetic field generating apparatus which conventionally has two magnetic field coils, a magnetic field is generated which changes over time during a measurement process and the magnetic field at least partially permeates the electrically conductive medium which is flowing through a measurement tube. The generated magnetic field has a component perpendicular to the flow direction of the medium and the part of the measurement tube touching the medium is electrically insulating. The electrical field intensity produced by induction in the medium can be measured, for example, by electrodes which are electrically in contact with the medium as electrical voltage or are capacitively detected by electrodes which are not electrically in contact with the medium. Then, the flow rate of the medium through the measurement tube is derived from the measured signals. The measurement error from the magnetic-inductive flow meters known from the prior art is less than 0.2%.

For the magnetic-inductive flow meters underlying the invention as prior art reference is made, by way of example, to German Patent Application Nos. 197 08 857, 10 2004 063 617 (which corresponds to U.S. Pat. No. 7,261,001), 10 2008 057 755 (which corresponds to U.S. Patent Application Publication 2010/0126282) and 10 2008 057 756 (which corresponds to U.S. Patent Application Publication 2010/0132478). The disclosure content of these documents is hereby expressly incorporated by reference in this patent application.

In a host of applications, it is necessary to arrange and operate several magnetic-inductive flow meters adjacent to one another. A first and a second magnetic-inductive flow meter are adjacent for the following considerations if at least the magnetic field produced by the magnetic field generating apparatus of the first flow meter at least partially permeates the measurement tube of the second flow meter. Of course, an adjacent arrangement is not limited to two flow meters. Often, it is not possible, for example, under limited space conditions, to choose the spatial distance from the magnetic-inductive flow meters to be so great that they are not adjacent. Shielding of the flow meters would be associated with additional costs and effort.

If the first flow meter and the second flow meter in operation carry out measurement processes, it is unknown, on the one hand, whether the measurement processes of the two adjacent flow meters overlap in time, and on the other hand, how great the time overlap, which is generally not constant, is in the case of a time overlap.

If a time overlap of the measurement processes of the two adjacent flow meters is assumed, in the measurement tube of the second flow meter, the magnetic field which has been produced by the magnetic field generating apparatus of the second flow meter and the magnetic field which has been generated by the magnetic field generation apparatus of the first flow meter and which extends as far as the measurement tube of the second flow meter are superimposed. The superposition of the two magnetic fields results in an induced electrical voltage which varies in an unknown manner and a corresponding influence on the flow rate measurements; this means a reduction of the measurement accuracy. Thus, for example, at a constant flow rate through the measurement tube of one flow meter, a varying flow rate can be indicated by the flow meter. Of course, the measurement process of the second flow meter also influences the measured value of the flow rate of the first flow meter.

SUMMARY OF THE INVENTION

The primary object of this invention is to devise a method for improving the measurement accuracy in adjacently arranged magnetic-inductive flow meters and to devise a correspondingly improved arrangement of several adjacent magnetic-inductive flow meters.

The method in accordance with the invention for operating several adjacent magnetic-inductive flow meters in which the above object is achieved is characterized, first of all, essentially in that the measurement processes of individual adjacent flow meters are synchronized to prevent variations of the mutual influence on the flow rate measurements by the magnetic fields of adjacent flow meters. A synchronized measurement process of adjacent flow meters is called a synchronous measurement process for short. The mutual influence on the flow rate measurements during the implementation of the synchronous measurement process is always the same due to the method in accordance with the invention.

According to one preferred configuration of the method in accordance with the invention, it is provided that, during a measurement process, in at least one of the adjacent flow meters, a magnetic field is not produced by the magnetic field generating apparatus of the flow meter. If not all magnetic field generating apparatus of adjacent flow meters generate a magnetic field during a measurement process, the mutual influence on the flow rate measurements is reduced and the measurement quality improves. If only the magnetic field generating apparatus of just one of the adjacent flow meters generates a magnetic field during a measurement process, the flow meter rate measurement is not influenced. The converse is that also only one flow rate is measured. A measurement process in which a magnetic field is produced only by the magnetic field generating apparatus of just one of the adjacent flow meters is called an individual measurement process.

In another especially advantageous configuration of the method in accordance with the invention, it is provided that a series of measurements is taken and the series of measurements comprises at least one synchronous measurement process and at least one individual measurement process for each of the adjacent flow meters. In the series of measurements, it must be ensured that the flow rate through each of the adjacent flow meters is relatively constant between at least one individual measurement process and at least one synchronous measurement process. The difference of the measured flow rate values from an individual measurement process and a synchronous measurement process of each of the adjacent flow meters at a relatively constant flow rate through the measurement tube of this flowmeter is a measure of the influence on this flow meter by the other adjacent flow meters from which the compensation for the influence is derived. Since variations of the flow rate between an individual measurement process and a synchronous measurement process act directly on the difference of the measured flow rate values, and thus, also on the compensation for the influence, the requirement arises for a relatively constant flow rate directly from the requirement for measurement accuracy. The accuracy of measured flow rate values from synchronous measurement processes with compensation is not reduced by the adjacent arrangement of flow meters. A shielding of the flow meters which is associated with high costs and effort or an arrangement with a larger spatial distance is not necessary.

In another preferred configuration of the method in accordance with the invention, the relative constancy of the flow rate through one of the adjacent flow meters is monitored by at least one synchronous measurement process before and at least one synchronous measurement process after at least one individual measurement process or by at least one individual measurement process before and at least one individual measurement process after at least one synchronous measurement process. The measurements with insufficient constancy of the flow rate by one of the adjacent flow meters are discarded and not considered in the series of measurements.

As already stated at the beginning, the invention also relates to an arrangement of adjacent magnetic-inductive flow meters, each of the adjacent flow meters comprising a control apparatus and the control apparatus of the adjacent flow meters being set up such that the adjacent flow meters carry out the method in accordance with the invention. The additional functionality, for example, for the non-generation of the magnetic field during a measurement process or the derivation of the compensation is implemented with flow meters which correspond to the prior art.

One preferred embodiment of the arrangement in accordance with the invention is characterized in that, to control the measurement processes, the control apparatus of each of the adjacent flow meters has at least one interface and the interfaces of the adjacent flow meters are interconnected. To connect the interfaces of the adjacent flow meters, there can be a control line which is hereinafter called the synchronization line. Very different synchronization signals can be transmitted over this synchronization line to the interfaces of the individual flow meters. Thus, the synchronization signals could be synchronization pulses with a variable pulse width. The flank of the synchronization pulse, specifically the rising and/or falling flanks, can be initiating.

The synchronization line which is necessary for operation, as explained above, can also be used, in addition to further data transmission, for example, for transmission of data for parameterization of the individual flow meters.

In one preferred configuration of the invention, the control apparatus of each of the adjacent flow meters is equipped with a RS485 interface and the RS485 interfaces are interconnected. The measurement processes of the adjacent flow meter are controlled by one of the adjacent flow meters. The additional functionality, for example, for synchronization of the measurement process of the adjacent flow meters or for selection of these flow meters whose magnetic field generating apparatus are not designed to produce a magnetic field during a measurement process is implemented with the flow meter which corresponds to the prior art. An additional control apparatus is therefore not necessary.

In particular, there are various possibilities for embodying and developing the method in accordance with the invention for operation of several adjacent magnetic-inductive flow meters and the arrangement of several adjacent magnetic-inductive flow meters in accordance with the invention. In this respect reference is made to the detailed description of a preferred exemplary embodiment in conjunction with the accompanying drawings.

DETAILED DESCRIPTION OF THE INVENTION

Figure 1:
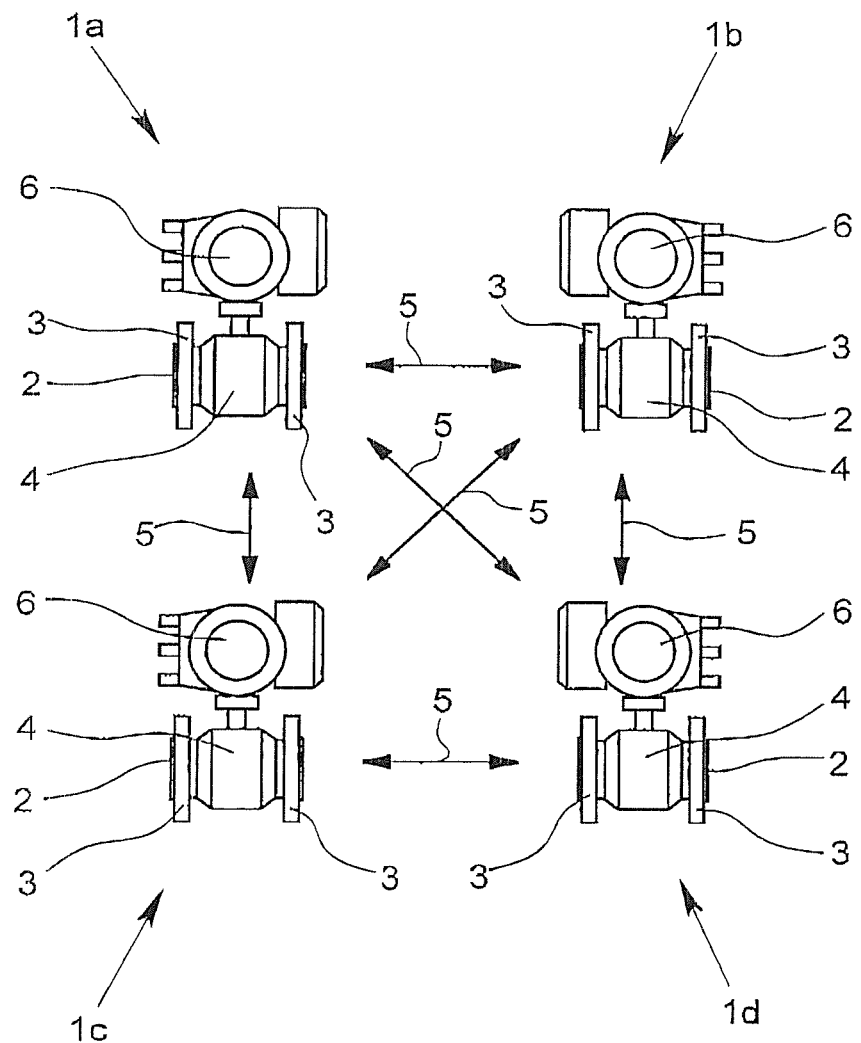
FIG. 1 shows an adjacent arrangement of four magnetic-inductive flow meters equipped with control apparatus in accordance with the invention with schematically shown mutual influences on the flow rate measurements and FIG. 2 shows the arrangement from FIG. 1 with the connected interfaces which are contained in the control apparatus.
Figure 2:
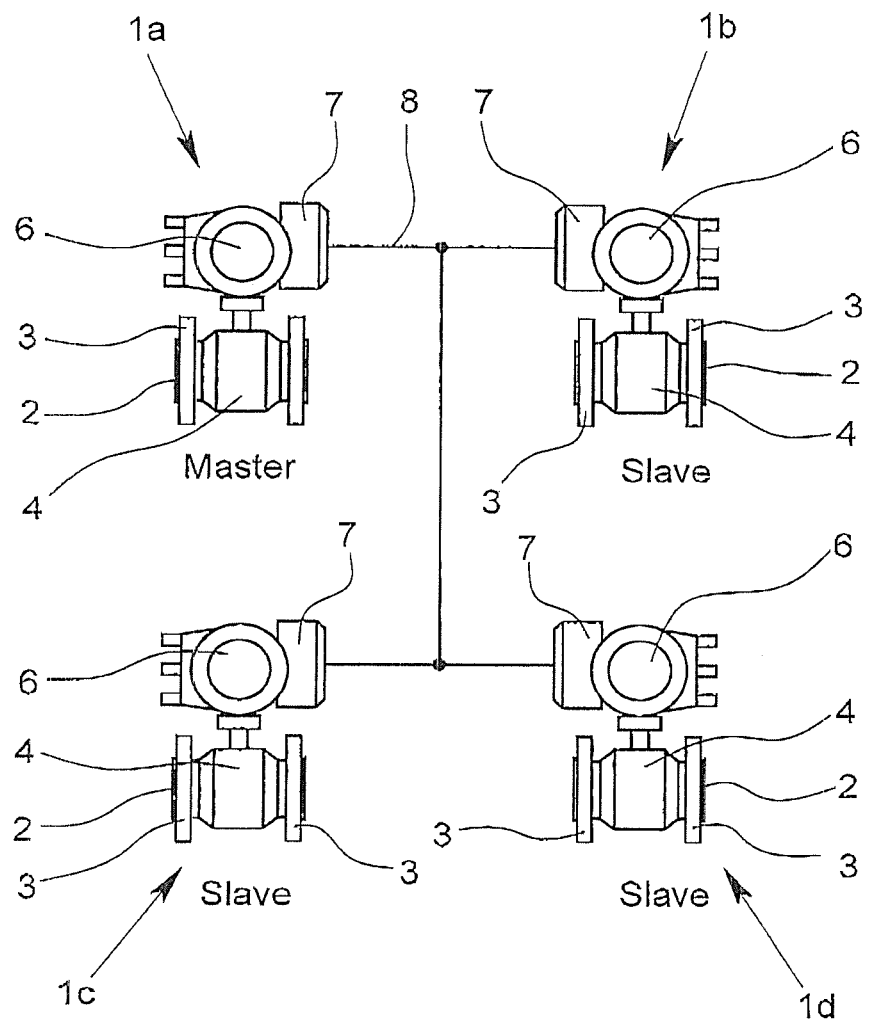

FIGS. 1 and 2 show an adjacent arrangement of four magnetic-inductive flow meters 1, individually labeled 1a, 1b, 1c and 1d. Each flow meter includes a measurement tube 2 through which an electrically conductive medium flows, with a constant outside diameter and a flange 3 on each end of the measurement tube 3. A magnetic field generating apparatus and a measurement apparatus are located on the measurement tube 3 and are hidden under a cover 4. The magnetic field generating apparatus generates a magnetic field which permeates the medium in the measurement tube 3 and the voltage which has been induced by the magnetic field in the medium flowing through the measurement tube 3 is detected by the measurement apparatus.

The mutual dependencies of the influences 5 on the flow rate measurements are illustrated in FIG. 1. The magnetic field generated by the magnetic field generating apparatus of a flow meter 1 permeates not only the measurement tube 2 of this flow meter 1, but also permeates the measurement tubes 2 of the other adjacent flow meters 1. Without synchronization of the measurement processes of the adjacent flow meters 1 and compensation for the mutual variation-free influences, the flow rate which has been measured by a flow meter is potentially adulterated by the magnetic fields of the three other flow meters.

FIG. 2 shows the arrangement of adjacent flow meters 1a, 1b, 1c, 1d and the respective control apparatus 6 for them, and which apparatus are set up to implement the method in accordance with the invention. The control apparatus 6 have interfaces 7, and the interfaces 7 are interconnected by a control line, hereinafter called a synchronization line 8.

The measurement processes of the adjacent flow meters 1b, 1c, 1d are controlled by the flow meter 1a, for which reason the flow meter 1a is called the master flow meter, while the other flow meters 1b, 1c, 1d are called slave flow meters.

A synchronization measurement process by all four flow meters 1 is conducted by the master flow meter 1a being started with a synchronization signal being transmitted via the interfaces 7 and the synchronization line 8 to the slave flow meters 1b, 1c, and 1d. The mutual influences on flow rate measurements are free of variation because the measurement processes of all adjacent flow meters 1 run synchronously.

It was stated above that the master flow meter 1a starts a synchronous measurement process by a synchronization signal which is transmitted via the interfaces 7 and the synchronization line 8 to the slave flow meters 1b, 1c and 1d. In doing so, the synchronization signals can be quite different. Thus, the synchronization signals can be synchronization pulses with variable pulse widths. Here, the flank of the synchronization pulses, rising or falling, can be initiating. The master flow meter 1a establishes by the synchronization signals which magnetic field generating apparatus of the adjacent flow meters 1 generate a magnetic field during a measurement process and which magnetic field generating apparatus do not generate a magnetic field.

The synchronization line 8, which is important for operation as explained above can also be used in addition for data transmission, for example, for parameterization of the individual flow meters 1.

To acquire the flow rate measurement data which are necessary to compensate for variation-free mutual influences on the flow rate measurements, a series of measurements is taken during which media flow through the measurement tubes 2 of the adjacent flow meters 1. First, a synchronous measurement process is carried out. Afterwards, with each of the adjacent flow meters 1, an individual measurement process is carried out. Finally, a synchronous measurement process is carried out. If the flow rates which have been measured with the synchronous measurement processes before and after the individual measurement processes through each of the measurement tubes 2 are relatively constant, a compensation for the influences is derived from the differences between the flow rates of each flow meter 1 which have been measured in the individual measurement processes and those measured in the synchronous measurement process after the individual measurement processes. If the flow rates through the measurement tubes 2 are not constant enough, the measurement values are discarded and the measurements repeated.

What is claimed is:

1. A method for operation of several adjacent magnetic-inductive flow meters, each of the adjacent flow meters comprising a measurement tube through which an electrically conductive medium flows, a magnetic field generating apparatus for permeating the medium with a magnetic field which comprises a component perpendicular to the longitudinal axis of the measurement tube, and a measurement apparatus for measuring the voltage which has been induced into the medium and for determining the flow rate from the induced voltage, comprising the steps to prevent variations of the mutual influences on the flow rate measurements by the magnetic fields of adjacent flow meters, of: conducting individual measurement processes using each of the adjacent flow meters individually and then performing a synchronous measurement process with all of the adjacent flow meters,
wherein during the synchronous measurement process in at least one of the adjacent flow meters, a magnetic field is not produce by the magnetic field generating apparatus of said at least one flow meter.

2. The method in accordance with claim 1, wherein, during the individual measurement process, a magnetic field is generated only by the magnetic field generation apparatus of a single one of the adjacent flow meters.

3. The method in accordance with claim 2, wherein a series of measurements is taken and the series of measurements comprises at least one synchronous measurement process and at least one individual measurement process for each of the adjacent flow meters and wherein, if the flow rate through the measurement tube of each of the adjacent flow meters is determined to be relatively constant between at least one individual measurement process and at least one synchronous measurement process, a compensation for the influences is derived from the differences between the flow rates of each flow meter which have been measured in the individual measurement processes and those measured in the synchronous measurement process.

4. The method in accordance with claim 3, wherein the relative constancy of the flow rate through the measurement tube of one of the adjacent flow meters is monitored by at least one synchronous measurement process before and at least one synchronous measurement process after at least one individual measurement process.

5. The method in accordance with claim 3, wherein the relative constancy of the flow rate through the measurement tube of one of the adjacent flow meters is monitored by at least one individual measurement process before and at least one individual measurement process after at least one synchronous measurement process.

6. The method in accordance with claim 3, wherein if the flow rate through the measurement tube of any of the adjacent flow meters is determined to be insufficiently constant, the measurements from any such one of the adjacent flow meters are discarded.

7. The method in accordance with claim 6, wherein using measured flow rate values from the individual measurement processes and the synchronous measurement processes, the mutual influences on the flow rate measurements, which influences are free of variations, are compensated by the magnetic fields of the adjacent flow meters.

8. The method in accordance with claim 1, wherein one of the adjacent flow meters controls the measurement processes of the other of the adjacent flow meters.

* * * * *